(12) United States Patent
Bjorstrom et al.

(10) Patent No.: US 8,861,141 B2
(45) Date of Patent: Oct. 14, 2014

(54) DAMPED DUAL STAGE ACTUATION DISK DRIVE SUSPENSIONS

(71) Applicant: Hutchinson Technology Incorporated, Hutchinson, MN (US)

(72) Inventors: Jacob D. Bjorstrom, Hutchinson, MN (US); Zachary A. Pokornowski, Cokato, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 13/955,204

(22) Filed: Jul. 31, 2013

(65) Prior Publication Data
US 2014/0063660 A1 Mar. 6, 2014

Related U.S. Application Data

(60) Provisional application No. 61/696,536, filed on Sep. 4, 2012, provisional application No. 61/695,490, filed on Aug. 31, 2012.

(51) Int. Cl.
*G11B 5/56* (2006.01)
*G11B 21/24* (2006.01)
*G11B 5/48* (2006.01)

(52) U.S. Cl.
CPC .................................. *G11B 5/4873* (2013.01)
USPC .................................... 360/244.8; 360/294.4

(58) Field of Classification Search
CPC .. G11B 5/5552; G11B 5/4826; G11B 5/4873; G11B 5/4833; G11B 5/4853; G11B 5/596
USPC ........... 360/264.3, 264.5, 264.4, 294.3, 294.4
See application file for complete search history.

(56) References Cited

U.S. PATENT DOCUMENTS

| 3,320,556 A | 5/1967 | Schneider |
| 4,418,239 A | 11/1983 | Larson et al. |

(Continued)

FOREIGN PATENT DOCUMENTS

| EP | 0591954 B1 | 4/1994 |
| EP | 0834867 B1 | 5/2007 |

(Continued)

OTHER PUBLICATIONS

U.S. Appl. No. 13/972,137 entitled Co-Located Gimbal-Based Dual Stage Actuation Disk Drive Suspensions With Offset Motors, filed Aug. 21, 2013.

(Continued)

*Primary Examiner* — Brian Miller
(74) *Attorney, Agent, or Firm* — Faegre Baker Daniels LLP

(57) ABSTRACT

Various embodiments concern a DSA suspension of a disk drive. The DSA suspension comprises a support configured to attach to the disk drive, the support comprising a proximal portion, a distal portion, and a linkage portion therebetween. The DSA head suspension system further comprises at least one motor mounted on the support, each motor positioned between the proximal portion and the distal portion. The DSA suspension further comprises a damper attached to some or all of the proximal portion, the motor(s), the distal portion, and the linkage portion. The damper can be a single layer or multilayered. The damper can comprise viscoelastic material. The damper can be adhesive. The damper may only be attached to the support and the motors and not to other components of the DSA suspension.

30 Claims, 12 Drawing Sheets

(56) References Cited

U.S. PATENT DOCUMENTS

| | | | |
|---|---|---|---|
| 5,140,288 A | 8/1992 | Grunwell | |
| 5,321,568 A | 6/1994 | Hatam-Tabrizi | |
| 5,333,085 A | 7/1994 | Prentice et al. | |
| 5,427,848 A | 6/1995 | Baer et al. | |
| 5,459,921 A | 10/1995 | Hudson et al. | |
| 5,485,053 A | 1/1996 | Baz | |
| 5,491,597 A | 2/1996 | Bennin et al. | |
| 5,598,307 A | 1/1997 | Bennin | |
| 5,608,591 A | 3/1997 | Klaassen | |
| 5,631,786 A | 5/1997 | Erpelding | |
| 5,636,089 A | 6/1997 | Jurgenson et al. | |
| 5,657,188 A | 8/1997 | Jurgenson et al. | |
| 5,666,241 A | 9/1997 | Summers | |
| 5,666,717 A | 9/1997 | Matsumoto et al. | |
| 5,694,270 A | 12/1997 | Katsuhide et al. | |
| 5,717,547 A | 2/1998 | Young | |
| 5,734,526 A | 3/1998 | Symons | |
| 5,737,152 A | 4/1998 | Balakrishnan | |
| 5,764,444 A * | 6/1998 | Imamura et al. | 360/294.4 |
| 5,790,347 A | 8/1998 | Girard | |
| 5,796,552 A | 8/1998 | Akin, Jr. et al. | |
| 5,805,382 A | 9/1998 | Lee et al. | |
| 5,812,344 A | 9/1998 | Balakrishnan | |
| 5,862,010 A | 1/1999 | Simmons et al. | |
| 5,892,637 A | 4/1999 | Brooks, Jr. et al. | |
| 5,921,131 A | 7/1999 | Stange | |
| 5,924,187 A | 7/1999 | Matz | |
| 5,973,884 A | 10/1999 | Hagen | |
| 5,986,853 A | 11/1999 | Simmons et al. | |
| 5,995,328 A | 11/1999 | Balakrishnan | |
| 6,011,671 A | 1/2000 | Masse et al. | |
| 6,038,102 A | 3/2000 | Balakrishnan et al. | |
| 6,055,132 A | 4/2000 | Arya et al. | |
| 6,075,676 A | 6/2000 | Hiraoka et al. | |
| 6,078,470 A | 6/2000 | Danielson et al. | |
| 6,108,175 A | 8/2000 | Hawwa et al. | |
| 6,118,637 A | 9/2000 | Wright et al. | |
| 6,144,531 A | 11/2000 | Sawai | |
| 6,146,813 A | 11/2000 | Girard et al. | |
| 6,157,522 A | 12/2000 | Murphy et al. | |
| 6,172,853 B1 | 1/2001 | Davis et al. | |
| 6,195,227 B1 | 2/2001 | Fan et al. | |
| 6,239,953 B1 | 5/2001 | Mei | |
| 6,246,546 B1 | 6/2001 | Tangren | |
| 6,246,552 B1 * | 6/2001 | Soeno et al. | 360/294.4 |
| 6,275,358 B1 | 8/2001 | Balakrishnan et al. | |
| 6,278,587 B1 | 8/2001 | Mei | |
| 6,282,062 B1 | 8/2001 | Shiraishi | |
| 6,295,185 B1 | 9/2001 | Stefansky | |
| 6,297,936 B1 | 10/2001 | Kant et al. | |
| 6,300,846 B1 | 10/2001 | Brunker | |
| 6,320,730 B1 | 11/2001 | Stefansky et al. | |
| 6,376,964 B1 | 4/2002 | Young et al. | |
| 6,396,667 B1 | 5/2002 | Zhang et al. | |
| 6,399,899 B1 | 6/2002 | Ohkawa et al. | |
| 6,400,532 B1 | 6/2002 | Mei | |
| 6,404,594 B1 | 6/2002 | Maruyama et al. | |
| 6,424,500 B1 | 7/2002 | Coon et al. | |
| 6,445,546 B1 | 9/2002 | Coon | |
| 6,493,190 B1 | 12/2002 | Coon | |
| 6,493,192 B2 | 12/2002 | Crane et al. | |
| 6,549,736 B2 | 4/2003 | Miyabe et al. | |
| 6,563,676 B1 | 5/2003 | Chew et al. | |
| 6,596,184 B1 | 7/2003 | Shum et al. | |
| 6,597,541 B2 * | 7/2003 | Nishida et al. | 360/294.4 |
| 6,621,653 B1 | 9/2003 | Schirle | |
| 6,621,658 B1 | 9/2003 | Nashif | |
| 6,636,388 B2 * | 10/2003 | Stefansky | 360/294.5 |
| 6,639,761 B1 | 10/2003 | Boutaghou | |
| 6,661,618 B2 * | 12/2003 | Fujiwara et al. | 360/294.4 |
| 6,704,157 B2 * | 3/2004 | Himes et al. | 360/75 |
| 6,704,158 B2 | 3/2004 | Hawwa et al. | |
| 6,714,384 B2 | 3/2004 | Himes et al. | |
| 6,714,385 B1 | 3/2004 | Even et al. | |
| 6,728,057 B2 | 4/2004 | Putnam | |
| 6,728,077 B1 | 4/2004 | Murphy | |
| 6,731,472 B2 | 5/2004 | Okamoto et al. | |
| 6,735,055 B1 | 5/2004 | Crane et al. | |
| 6,737,931 B2 | 5/2004 | Amparan et al. | |
| 6,738,225 B1 | 5/2004 | Summers et al. | |
| 6,741,424 B1 * | 5/2004 | Danielson et al. | 360/244.9 |
| 6,760,182 B2 | 7/2004 | Bement et al. | |
| 6,760,194 B2 | 7/2004 | Shiraishi et al. | |
| 6,760,196 B1 | 7/2004 | Niu et al. | |
| 6,762,913 B1 | 7/2004 | Even et al. | |
| 6,765,761 B2 * | 7/2004 | Arya | 360/244.7 |
| 6,791,802 B2 * | 9/2004 | Watanabe et al. | 360/294.4 |
| 6,798,597 B1 | 9/2004 | Aram et al. | |
| 6,801,402 B1 | 10/2004 | Subrahmanyam et al. | |
| 6,839,204 B2 | 1/2005 | Shiraishi et al. | |
| 6,841,737 B2 | 1/2005 | Komatsubara et al. | |
| 6,898,042 B2 | 5/2005 | Subrahmanyan | |
| 6,900,967 B1 | 5/2005 | Coon et al. | |
| 6,922,305 B2 | 7/2005 | Price | |
| 6,934,127 B2 | 8/2005 | Yao et al. | |
| 6,942,817 B2 | 9/2005 | Yagi et al. | |
| 6,943,991 B2 | 9/2005 | Yao et al. | |
| 6,963,471 B2 | 11/2005 | Arai et al. | |
| 6,975,488 B1 | 12/2005 | Kulangara et al. | |
| 6,977,790 B1 | 12/2005 | Chen | |
| 7,006,333 B1 | 2/2006 | Summers | |
| 7,016,159 B1 * | 3/2006 | Bjorstrom et al. | 360/294.6 |
| 7,020,949 B2 | 4/2006 | Muramatsu et al. | |
| 7,023,667 B2 | 4/2006 | Shum | |
| 7,050,267 B2 | 5/2006 | Koh et al. | |
| 7,057,857 B1 | 6/2006 | Niu et al. | |
| 7,079,357 B1 | 7/2006 | Kulangara et al. | |
| 7,082,670 B2 * | 8/2006 | Boismier et al. | 29/603.06 |
| 7,092,215 B2 | 8/2006 | Someya et al. | |
| 7,132,607 B2 | 11/2006 | Yoshimi et al. | |
| 7,142,395 B2 | 11/2006 | Swanson et al. | |
| 7,144,687 B2 | 12/2006 | Fujisaki et al. | |
| 7,159,300 B2 | 1/2007 | Yao et al. | |
| 7,161,767 B2 | 1/2007 | Hernandez et al. | |
| 7,256,968 B1 | 8/2007 | Krinke | |
| 7,271,958 B2 | 9/2007 | Yoon et al. | |
| 7,292,413 B1 | 11/2007 | Coon | |
| 7,336,436 B2 | 2/2008 | Sharma et al. | |
| 7,342,750 B2 | 3/2008 | Yang et al. | |
| 7,345,851 B2 | 3/2008 | Hirano et al. | |
| 7,375,930 B2 * | 5/2008 | Yang et al. | 360/294.4 |
| 7,379,274 B2 | 5/2008 | Gao Yao et al. | |
| 7,382,582 B1 | 6/2008 | Cuevas | |
| 7,408,745 B2 | 8/2008 | Yao et al. | |
| 7,417,830 B1 * | 8/2008 | Kulangara | 360/294.4 |
| 7,460,337 B1 | 12/2008 | Mei | |
| 7,466,520 B2 | 12/2008 | White et al. | |
| 7,499,246 B2 | 3/2009 | Nakagawa | |
| 7,518,830 B1 | 4/2009 | Panchal et al. | |
| 7,567,410 B1 | 7/2009 | Zhang et al. | |
| 7,595,965 B1 | 9/2009 | Kulangara et al. | |
| 7,643,252 B2 | 1/2010 | Arai et al. | |
| 7,663,841 B2 | 2/2010 | Budde et al. | |
| 7,667,921 B2 | 2/2010 | Satoh et al. | |
| 7,675,713 B2 | 3/2010 | Ogawa et al. | |
| 7,688,552 B2 | 3/2010 | Yao et al. | |
| 7,692,899 B2 | 4/2010 | Arai et al. | |
| 7,701,673 B2 | 4/2010 | Wang et al. | |
| 7,701,674 B2 | 4/2010 | Arai | |
| 7,719,798 B2 | 5/2010 | Yao | |
| 7,724,478 B2 | 5/2010 | Deguchi et al. | |
| 7,751,153 B1 | 7/2010 | Kulangara et al. | |
| 7,768,746 B2 | 8/2010 | Yao et al. | |
| 7,782,572 B2 | 8/2010 | Pro | |
| 7,821,742 B1 | 10/2010 | Mei | |
| 7,835,113 B1 | 11/2010 | Douglas | |
| 7,875,804 B1 | 1/2011 | Tronnes et al. | |
| 7,923,644 B2 | 4/2011 | Ishii et al. | |
| 7,924,530 B1 | 4/2011 | Chocholaty | |
| 7,983,008 B2 * | 7/2011 | Liao et al. | 360/294.4 |
| 7,986,494 B2 | 7/2011 | Pro | |
| 8,004,798 B1 | 8/2011 | Dunn | |
| 8,085,508 B2 | 12/2011 | Hatch | |
| 8,089,728 B2 | 1/2012 | Yao et al. | |

(56) References Cited

U.S. PATENT DOCUMENTS

| | | | |
|---|---|---|---|
| 8,120,878 B1 | 2/2012 | Drape et al. | |
| 8,125,736 B2 | 2/2012 | Nojima et al. | |
| 8,125,741 B2 | 2/2012 | Shelor | |
| 8,144,436 B2* | 3/2012 | Iriuchijima et al. | 360/294.4 |
| 8,149,542 B2 | 4/2012 | Ando | |
| 8,161,626 B2* | 4/2012 | Ikeji | 29/603.06 |
| 8,169,746 B1 | 5/2012 | Rice et al. | |
| 8,189,301 B2 | 5/2012 | Schreiber | |
| 8,194,359 B2 | 6/2012 | Yao et al. | |
| 8,248,735 B2* | 8/2012 | Fujimoto et al. | 360/294.4 |
| 8,254,062 B2 | 8/2012 | Greminger | |
| 8,264,797 B2 | 9/2012 | Emley | |
| 8,289,652 B2 | 10/2012 | Zambri et al. | |
| 8,295,012 B1 | 10/2012 | Tian et al. | |
| 8,310,790 B1 | 11/2012 | Fanslau, Jr. | |
| 8,331,061 B2* | 12/2012 | Hanya et al. | 360/294.4 |
| 8,339,748 B2 | 12/2012 | Shum et al. | |
| 8,363,361 B2* | 1/2013 | Hanya et al. | 360/294.4 |
| 8,379,349 B1 | 2/2013 | Pro et al. | |
| 8,446,694 B1 | 5/2013 | Tian et al. | |
| 8,456,780 B1 | 6/2013 | Ruiz | |
| 8,498,082 B1* | 7/2013 | Padeski et al. | 360/294.4 |
| 8,526,142 B1* | 9/2013 | Dejkoonmak et al. | 360/294.4 |
| 8,559,137 B2* | 10/2013 | Imuta | 360/294.4 |
| 2001/0012181 A1 | 8/2001 | Inoue et al. | |
| 2001/0030838 A1 | 10/2001 | Takadera et al. | |
| 2001/0043443 A1 | 11/2001 | Okamoto et al. | |
| 2002/0118492 A1 | 8/2002 | Watanabe et al. | |
| 2002/0149888 A1 | 10/2002 | Motonishi et al. | |
| 2003/0053258 A1 | 3/2003 | Dunn et al. | |
| 2003/0174445 A1 | 9/2003 | Luo | |
| 2003/0202293 A1* | 10/2003 | Nakamura et al. | 360/294.4 |
| 2004/0027727 A1 | 2/2004 | Shimizu et al. | |
| 2004/0070884 A1 | 4/2004 | Someya et al. | |
| 2004/0125508 A1 | 7/2004 | Yang et al. | |
| 2005/0061542 A1 | 3/2005 | Aonuma et al. | |
| 2005/0063097 A1 | 3/2005 | Maruyama et al. | |
| 2005/0105217 A1 | 5/2005 | Kwon et al. | |
| 2005/0254175 A1 | 11/2005 | Swanson et al. | |
| 2005/0280944 A1 | 12/2005 | Yang et al. | |
| 2006/0044698 A1 | 3/2006 | Hirano et al. | |
| 2006/0077594 A1 | 4/2006 | White et al. | |
| 2006/0193086 A1 | 8/2006 | Zhu et al. | |
| 2006/0209465 A1 | 9/2006 | Takikawa et al. | |
| 2006/0238924 A1 | 10/2006 | Gatzen | |
| 2006/0279880 A1 | 12/2006 | Boutaghou et al. | |
| 2007/0133128 A1 | 6/2007 | Arai | |
| 2007/0153430 A1 | 7/2007 | Park et al. | |
| 2007/0223146 A1 | 9/2007 | Yao et al. | |
| 2007/0253176 A1 | 11/2007 | Ishii et al. | |
| 2008/0084638 A1 | 4/2008 | Bonin | |
| 2008/0144225 A1 | 6/2008 | Yao et al. | |
| 2008/0192384 A1 | 8/2008 | Danielson et al. | |
| 2008/0198511 A1 | 8/2008 | Hirano et al. | |
| 2008/0273266 A1 | 11/2008 | Pro | |
| 2008/0273269 A1 | 11/2008 | Pro | |
| 2009/0080117 A1* | 3/2009 | Shimizu et al. | 360/294.4 |
| 2009/0244786 A1 | 10/2009 | Hatch | |
| 2010/0067151 A1 | 3/2010 | Okawara et al. | |
| 2010/0177445 A1 | 7/2010 | Fuchino | |
| 2010/0208390 A1 | 8/2010 | Hanya et al. | |
| 2010/0290158 A1 | 11/2010 | Hanya et al. | |
| 2011/0096438 A1 | 4/2011 | Takada et al. | |
| 2011/0228425 A1 | 9/2011 | Liu et al. | |
| 2011/0242708 A1 | 10/2011 | Fuchino | |
| 2011/0299197 A1 | 12/2011 | Eguchi | |
| 2012/0002329 A1 | 1/2012 | Shum et al. | |
| 2012/0281316 A1 | 11/2012 | Fujimoto et al. | |
| 2013/0242434 A1 | 9/2013 | Bjorstrom, Jacob D. et al. | |
| 2013/0242436 A1 | 9/2013 | Yonekura et al. | |
| 2013/0265674 A1 | 10/2013 | Fanslau | |

FOREIGN PATENT DOCUMENTS

| | | |
|---|---|---|
| JP | 9198825 A | 7/1997 |
| JP | 10003632 A | 1/1998 |
| JP | 2001202731 A | 7/2001 |
| JP | 2002170607 A | 6/2002 |
| JP | 2003223771 A | 8/2003 |
| JP | 2004039056 A | 2/2004 |
| JP | 2005209336 A | 8/2005 |
| WO | WO9820485 A1 | 5/1998 |

OTHER PUBLICATIONS

U.S. Appl. No. 14/026,427 entitled Co-Located Gimbal-Based Dual Stage Actuation Disk Drive Suspensions, filed Sep. 13, 2013.

U.S. Appl. No. 14/044,238 entitled Co-Located Gimbal-Based Dual Stage Actuation Disk Drive Suspensions With Motor Stifeners, filed Oct. 2, 2013.

U.S. Appl. No. 14/050,060 entitled Co-Located Gimbal-Based Dual Stage Actuation Disk Drive Suspensions With Dampers, filed Oct. 10, 2013.

International Search Report and Written Opinion issued in PCT/US2013/031484, mailed May 30, 2013, 13 pages.

U.S. Appl. No. 13/690,883 entitled Microstructure Patterned Surfaces for Integrated Lead Head Suspensions, filed Nov. 30, 2012.

U.S. Appl. No. 13/827,622 entitled Mid-Loadbeam Dual Stage Actuated (DSA) Disk Drive Head Suspension, filed Mar. 14, 2013.

U.S. Appl. No. 14/056,481 entitled Two-Motor Co-Located Gimbal-Based Dual Stage Actuation Disk Drive Suspensions With Motor Stiffeners, filed Oct. 17, 2013.

U.S. Appl. No. 14/103,955 entitled Electrical Contacts to Motors in Dual Stage Actuated Suspensions, filed Dec. 12, 2013.

U.S. Appl. No. 13/365,443 entitled Elongated Trace Tethers for Disk Drive Head Suspension Flexures, filed Feb. 3, 2012.

U.S. Appl. No. 14/141,617 entitled Disk Drive Suspension Assembly Having a Partially Flangeless Load Point Dimple, filed Dec. 27, 2013, 53 pages.

U.S. Appl. No. 14/145,515 entitled Balanced Co-Located Gimbal-Based Dual Stage Actuation Disk Drive Suspensions, filed Dec. 31, 2013, 39 pages.

International Search Report and Written Opinion issued in PCT/US2013/052885, mailed Feb. 7, 2014, 13 pages.

International Search Report and Written Opinion issued in PCT/US2013/059702, dated Mar. 28, 2014, 9 pages.

International Search Report and Written Opinion issued in PCT/US2013/064314, dated Apr. 18, 2014, 10 pages.

Lengert, David et al., "Design of suspension-based and collocated dual stage actuated suspensions", Microsyst Technol (2012) 18:1615-1622.

\* cited by examiner

DAMPED DUAL STAGE ACTUATION DISK DRIVE SUSPENSIONS

CROSS-REFERENCE TO RELATED APPLICATION

This application claims priority to U.S. Provisional Application No. 61/695,490, filed Aug. 31, 2012, and to U.S. Provisional Application No. 61/696,536, filed Sep. 4, 2012, each of which is herein incorporated by reference in its entirety.

TECHNICAL FIELD

The present disclosure relates to disk drives and suspensions for disk drives. In particular, this disclosure concerns a dual stage actuation (DSA) suspension having a damper over a DSA region and a disk drive including one or more of the suspensions.

BACKGROUND

DSA disk drive head suspensions and disk drives incorporating DSA suspensions are generally known and commercially available. By way of example, one embodiment of a DSA head suspension 10 is shown in FIGS. 1A and 1B. The illustrated DSA suspension includes a baseplate 12, a hinge 14 or spring region, a load beam 16, and integrated lead flexure 18 with traces 20. The baseplate 12 includes a proximal portion 50, a distal portion 52, and a linkage portion 54 connecting the proximal portion 50 and the distal portion 52. The hinge 14 is mounted to hinge mounting portion of the baseplate 12 (at the distal portion 52) and extends from the distal end of the baseplate 12. The load beam 16 is mounted to the distal end of the hinge 14. The flexure 18 is mounted to the load beam 16, typically on the side of the load beam 12 mounted to the hinge 14. Weld spots 22 are typically used to join these components. The baseplate 12, the hinge 14, and the load beam 16 are typically formed from metal such as stainless steel. While these support components are discussed as separate elements, some or all of the baseplate 12, hinge 14, and load beam 16 can be formed from a single or multiple support elements. The flexure 18 typically includes a base layer of stainless steel. The copper or copper alloy traces 20 on the flexure 18 are separated from the stainless steel base layer by a layer of polyimide or other insulator.

The whole head suspension 10 can be moved to scan the head slider 19 over a spinning disk by a head suspension actuation system (shown further herein) that connects to the baseplate 12 as is known in the art. While movement of the whole head suspension 10 by the head suspension actuation system provides relatively course position control of a head slider 19, a second stage actuation functionality of the illustrated DSA head suspension 10 is incorporated into the baseplate 12 to control finer sway adjustments. Microactuations along the head suspension 10 produced by microactuating motors 26, as further described herein, can provide relatively fine positioning adjustment of the head slider 19. As shown, the baseplate 12 has one or more motor-receiving areas or openings 24 (two in the illustrated embodiment). Motors 26 are mounted to the baseplate 12 in the motor-receiving openings 24. The motors 26 are mounted to tabs 28 extending from the baseplate 12 into the motor-receiving openings 24, however other mounting options are possible. In the illustrated DSA suspension 10, the tabs 28 are portions of the hinge 14. In other embodiments (not shown), the tabs 28 to which the motors 26 are mounted can be other components such as a separate motor plate welded to the baseplate 12. In some other embodiments, the motors 26 can be mounted on the load beam 16. Epoxy or other adhesive is typically used to mount the motors 26 to the tabs 28 or other component.

The motors 26 comprise a generally planar element with a length (e.g., along a longitudinal axis) and a width. The motors 26 can be any suitable type of microactuator. For example, the motors 26 can each be a piezoelectric (PZT) microactuator, which may include a piezoelectric layer of lead zirconium titanate, polymers such as polyvinylidene fluoride (PVDF), or other piezoelectric or electrostrictive types of materials. As will be appreciated, each motor 26 includes terminals (not shown) for electrically coupling the motor 26 to a power supply.

DSA suspensions in accordance with this disclosure can be embodied in still other forms. For example, other DSA suspensions are described in the Okawara U.S. Patent Publication No. 2010/0067151, the Shum U.S. Patent Publication No. 2012/0002329, the Fuchino U.S. Patent Publication No. 2011/0242708, and the Imamura U.S. Pat. No. 5,764,444, each of which is incorporated herein by reference in its entirety and for all purposes.

There remains a continuing need for improved DSA suspensions. One area of improvement concerns improving the capability disk drives to responsively move the head slider 16 to follow rapid changes in a command input signal. The suspensions should also be capable of being efficiently manufactured.

SUMMARY

Various embodiments concern a dual stage actuation (DSA) head suspension system of a disk drive. The DSA head suspension system comprises a support configured to attach to the disk drive, the support comprising a proximal portion, a distal portion, and a linkage portion between the proximal portion and the distal portion. The support can be one or both of a baseplate or a load beam. The DSA head suspension system further comprises a first motor mounted on the support, the first motor positioned between the proximal portion and the distal portion. A second motor can additionally be provided between the proximal portion and the distal portion. The DSA head suspension system further comprises a damper attached to some or all of the proximal portion, the motor(s), the distal portion, and the linkage portion. The DSA head suspension system further comprises a head slider having circuitry configured to one or both of read and write data magnetically. The DSA head suspension system further comprises flexure electrically connected to the first motor, wherein electrical activation of the first motor causes the first motor to move the distal portion relative to the proximal portion to actuate the head slider laterally.

The damper can be a single layer or multilayered. The damper can comprise viscoelastic material. The damper can be adhesive. The damper may only be attached to the support and the motors and not to other components of the DSA head suspension system.

Various embodiments concern a method of making a DSA suspension. The method comprises forming a planar support, the support comprising a proximal portion, a distal portion, and at least one opening between the proximal portion and the distal portion. The planar support can comprise one or both of a baseplate and a load beam. The method can further include mounting at least one motor on the planar support, each motor positioned within a respective one of the at least one opening. The method can further include attaching a damper to each of the proximal portion and the distal portion. The method can further include attaching a head slider to the planar support.

The method can further include mounting flexure on the planar support and electrically connecting the flexure to the at least one motor.

While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

Figures 1A, 1B:
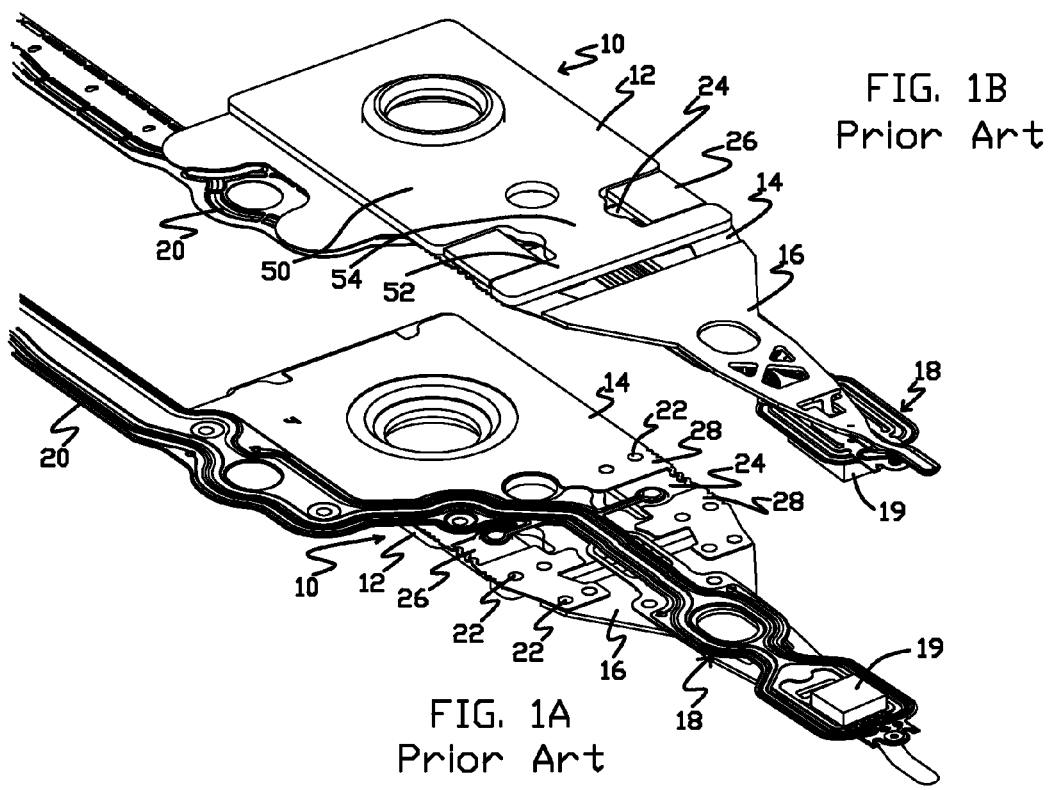
FIG. 1A is an isometric illustration of the flexure side of a prior art dual stage actuation (DSA) suspension.
FIG. 1B is an isometric illustration of the baseplate side, opposite the flexure side, of the prior art DSA suspension shown in FIG. 1A.

While the subject matter of this disclosure is amenable to various modifications and alternative forms, specific embodiments have been shown by way of example in the drawings and are described in detail below. The intention, however, is not to limit this disclosure to the particular embodiments described. On the contrary, this disclosure is intended to cover all modifications, equivalents, and alternatives falling within the scope of this disclosure as defined by the appended claims.

DETAILED DESCRIPTION

Dampening the DSA region of a suspension assembly increases the performance of DSA suspensions. A damper can suppress resonance vibration that can result when the head slider 19 floats over the rotating disk 12. As further discussed herein, reducing sway gain of the DSA suspension through dampening of the DSA region increases the tracking performance of the disk drive comparable to increasing the servo bandwidth. Various embodiments having a damper over a DSA region of a DSA suspension are presented herein.

Figure 2:
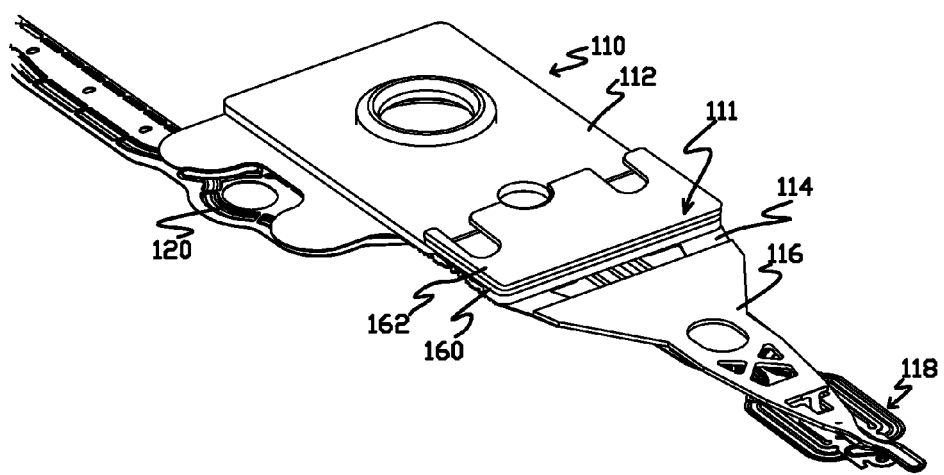
FIG. 2 is an isometric illustration of the baseplate side of a DSA suspension that includes a damper in accordance with one embodiment of this disclosure.

FIG. 2 is a perspective view of the baseplate side of a DSA suspension 110 having a DSA damper 111 in accordance with one embodiment of this disclosure. For purposes of example, the damper 111 is shown on a DSA suspension 110 such as that described above in connection with FIGS. 1A and 1B, and similar reference numbers are used herein throughout to identify similar features. For example, the DSA suspension 110 includes a baseplate 112 having a proximal portion 150 and a distal portion 152. A linkage portion 154 extends between the proximal portion 150 and the distal portion 152, between the motor-receiving openings 124 in the illustrated embodiment. The proximal portion 150 can have one or more mounting features, such as an aperture and/or swaging ring, for attaching to a pivot, positioning motor, or other component of the remainder of the disk drive. The distal portion 152 can serve as a mounting area for the hinge 114. The load beam 116 is connected to the baseplate 112 by the hinge 114.

The damper 111 extends over the DSA region. The DSA region can correspond to the section of the DSA suspension 110 that articulates the distal section of the DSA suspension 110 relative to the proximal section of the DSA suspension 110. In the embodiment of FIGS. 2-3D, the distal portion 152 is articulated, by the motors 126, relative to the proximal portion 150. In this way, the linkage portion 154 can flex. The proximal portion 150 can be defined as the portion of the baseplate 112 (or other support member) that is proximal of the motors 126. The distal portion 152 can be defined as the portion of the baseplate 112 (or other support member) that is distal of the motors 126. The damper 111 extends over the DSA region including the proximal portion 150, the distal portion 152, the linkage portion 154, and the motors 126. Furthermore, the damper 111 can be bonded to the proximal portion 150, the distal portion 152, the linkage portion 154, and/or the motors 126.

As shown in FIG. 2, the damper 111 can be a multi-layer structure that includes a viscoelastic material layer 160 and a constraint layer 162. The viscoelastic material layer 160 is attached to the constraint layer 162. The constraint layer 162 can be less flexible than the viscoelastic material layer 160 to limit stain on the viscoelastic material layer 160. The constraint layer 162 can be Mylar, and can have a thickness between about 125-150 μm. In other embodiments, the constraint layer 162 can be formed of other materials (e.g., liquid crystal polymer) and have a greater or lesser thickness.

The viscoelastic material layer 160 can be an adhesive material. In this case, the viscoelastic material layer 160 can adhere to the surfaces of the baseplate 112 (e.g., proximal portion 150 and distal portion 152), motors 126, and/or the constraint layer 162. The viscoelastic material layer 160 can have a thickness of about 50 μm. The viscoelastic material layer 160 can be formed from other materials and/or have greater or lesser thicknesses in other embodiments. In general, the thicker the constraint layer 162, the better the performance of the damper 111 because the constraint layer 162 will direct more energy into the viscoelastic material layer 160. The thicknesses and materials of the viscoelastic material layer 160 and the constraint layer 162 can be optimized to enhance the performance of the damper 111 in each specific suspension application.

As shown in FIG. 2, the damper 111 is generally planar. Accordingly, the damper 111 has a first major surface and a second major surface opposite the first major surface. The first major surface is facing, and adhered to, the baseplate 112. In this sense, the first major surface is the bottom surface of the damper 111. The second major surface is facing away from the baseplate 112 in an upward direction. In this sense, the second major surface is the top surface of the damper 111. As shown, the top surface of the damper 111 is exposed. No components are attached to the top surface of the damper 111. Furthermore, no other components are in contact with the top surface of the damper 111. In this sense, the top surface of the damper 111 is fully exposed. The damper further includes at least four sides. The surfaces of the sides include a proximal side surface facing proximally, a distal side surface facing distally, a left side surface facing laterally, and a right side surface facing laterally opposite the right side surface. No components are attached to the proximal side surface, the distal side surface, the left side surface, or the right side surface of the damper 111. Further, no components contact the proximal side surface, the distal side surface, the left side surface, or the right side surface of the damper 111. In this sense, each of the proximal side surface, the distal side surface, the left side surface, and the right side surface of the damper 111 are fully exposed.

In the illustrated embodiment of FIG. 2, the damper 111 has a size and an outer profile to substantially cover the distal portion 152, the linkage portion 154, and part of the proximal portion 150. The damper also covers the motors 126 and the entire motor-receiving openings 124, but is shaped so as to not overlap certain areas or structures such as those of the conductive epoxy contacts 157 between the motors 126 and baseplate 112. In other embodiments, the damper 111 can cover greater and/or lesser areas of the DSA region of the DSA suspension 110. In general, the greater the area of the baseplate 112 and/or motors 126 that are covered by the damper 111, the greater the performance enhancements that will be produced by the damper 111.

Figure 3A:
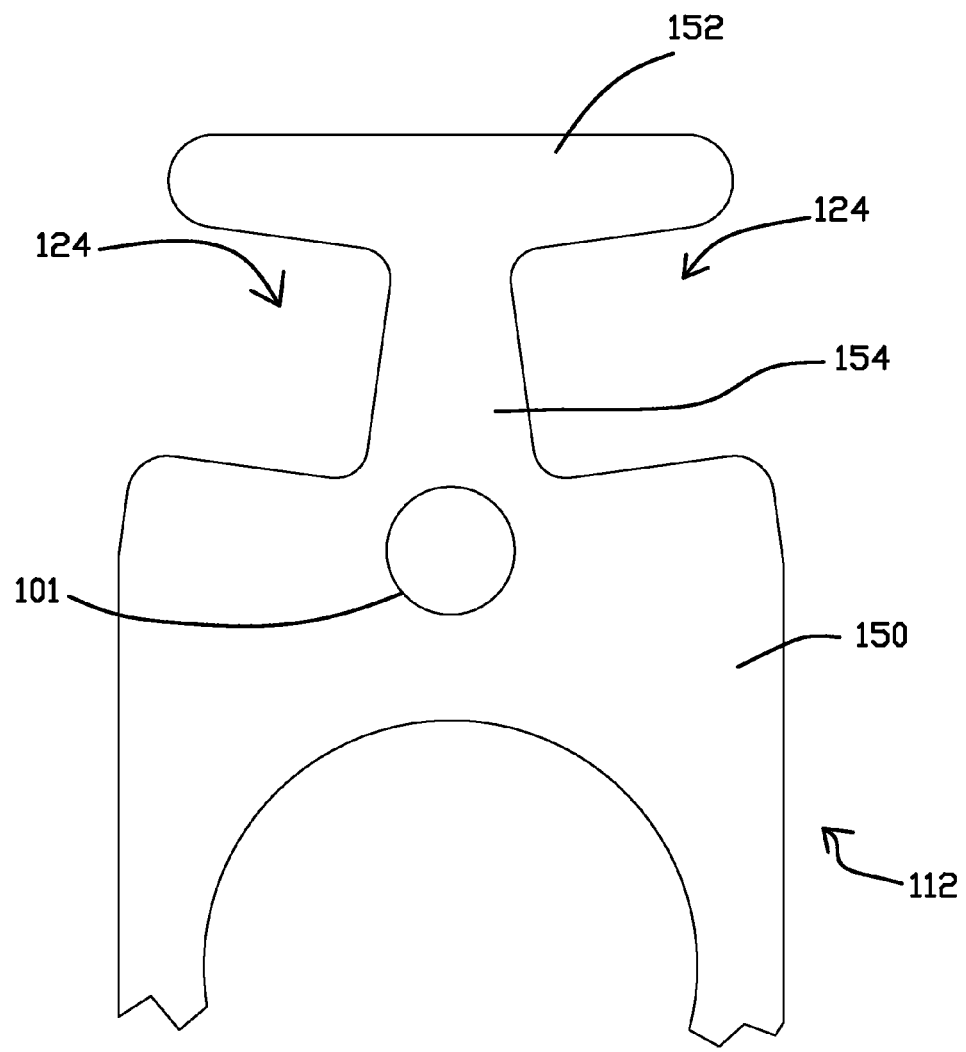
FIGS. 3A-D are illustrations of a process for forming the DSA portion of the suspension shown in FIG. 2.
Figure 3B:
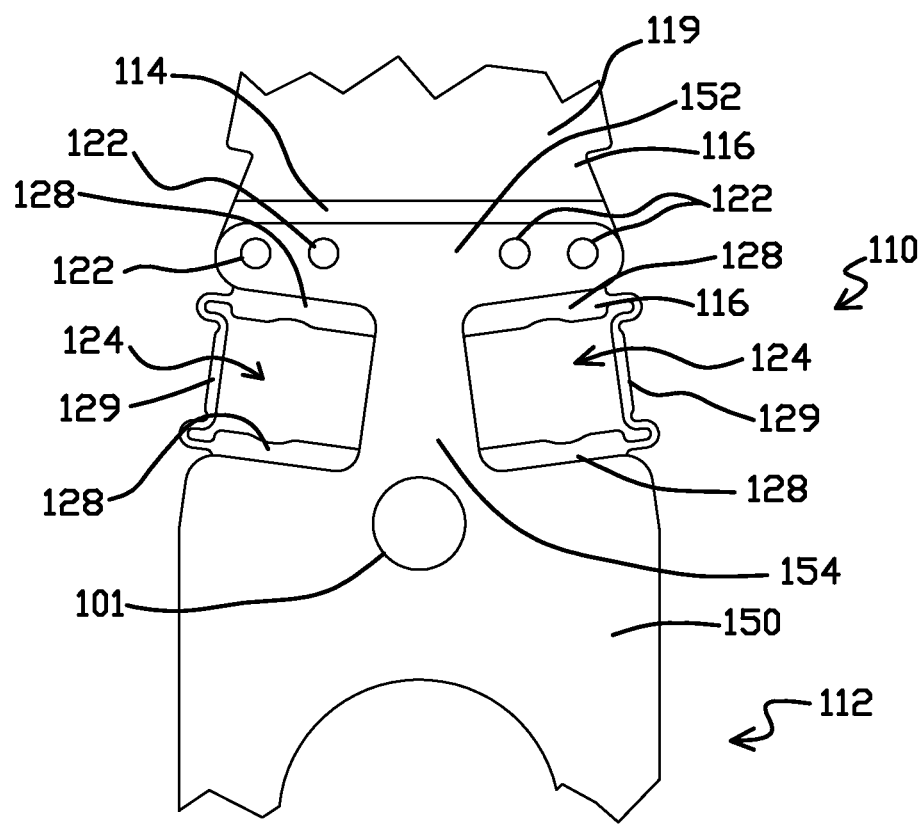
Figure 3C:
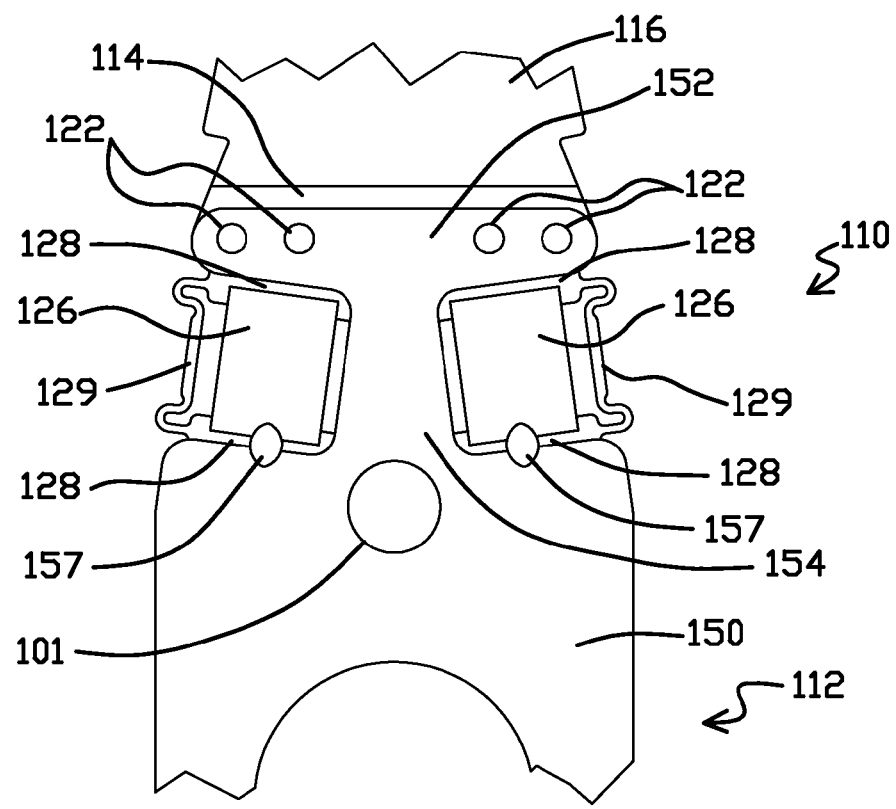
Figure 3D:
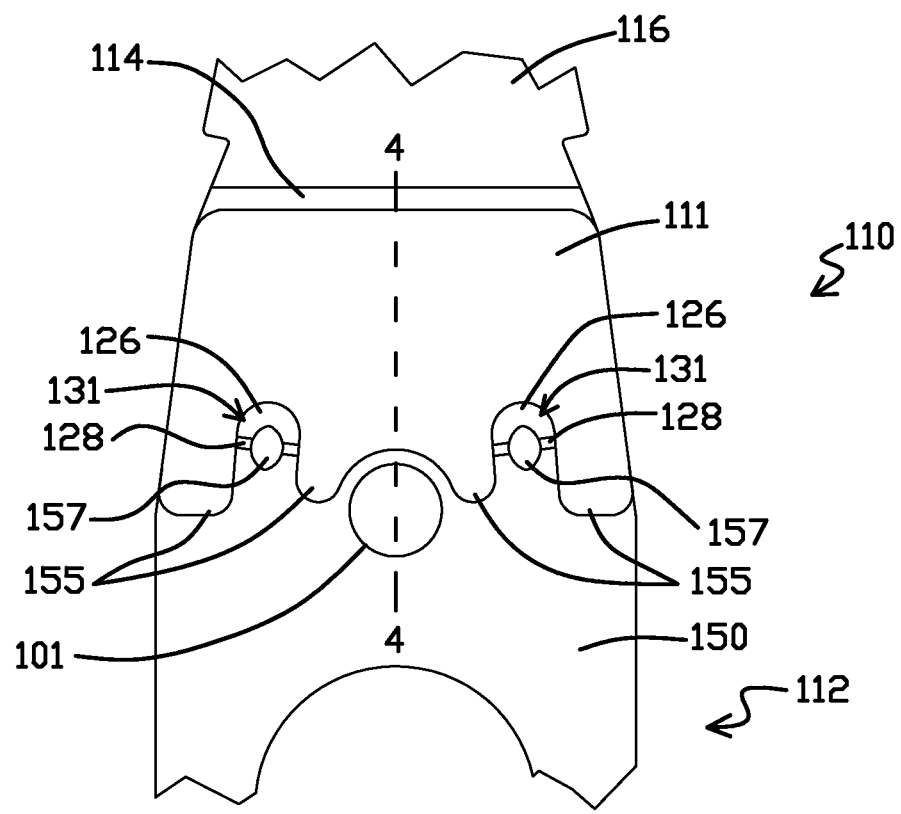

FIG. 3A-D show some assembly steps of the DSA suspension 110. FIG. 3A shows part of the baseplate 112, including the proximal portion 150, window 101, linkage portion 154, and the distal portion 152. These portions of the baseplate 112 can be formed from a single sheet of metal. FIG. 3B shows a load beam 116 having been attached to the underside of the baseplate 112. The load beam 116 can be formed from a sheet of metal that is typically thinner than the metal sheet of the baseplate 112. The load beam 116 can be attached to the baseplate 112 by welding, such as weld spots 122, along the distal portion 152. In some embodiments, the load beam 116 can be formed from several sheets to customize the mechanical functions of the load beam 116. As shown in FIG. 3B, the hinge 114 may be a biased metal layer attached to the distal portion 152 while a planar element is attached to the hinge 114 to form the major part of the load beam 116. The baseplate 112, the hinge 114, and the load beam 116 can form a support for supporting components of the DSA suspension (e.g., motors, flexure, head slider, etc.)

As shown in FIG. 3B, the load beam 116 or other structure can extend underneath the baseplate 112. The load beam 116 or other structure can be dimensioned relative to the baseplate 112 such that various parts of the load beam 116 or other structure extends laterally beyond the baseplate 112. In other words, the load beam 116 or other structure is not completely covered by the baseplate 112. As shown, tabs 128 extend over the openings 124 in the baseplate 112. The tabs 128 can be formed from the same metal sheet as the load beam 128. The tabs 128 can serve as mounting surfaces for the motors 126, as shown in FIG. 3C. The tabs 128 can be connected by struts 129 which help stabilize the DSA suspension 110 or other structure during articulation by the motors 126.

FIG. 3C shows the motors 126 having been placed within the openings 124. In some other embodiments, the motors 126 are merely placed over the openings 124. As shown, the motors 126 span the proximal and distal tabs 128 and are between the proximal portion 150 and the distal portion 152 of the baseplate 112. In some other embodiments, the motors 126 can attach to the proximal portion 150 and the distal portion 152 of the baseplate 112 without use of the tabs 128.

As shown in FIG. 3C, the motors 126 can be electrically coupled to the baseplate 112 by conductive epoxy contacts 157. Each of the top and bottom sides of the motors 126 can include a terminal surface for making electrical connections that power the motors 126. Flexure can connect to a top or bottom side of each motor 126 (e.g., the anode or cathode terminal) while the other of the top or bottom side of the motor 126 can be electrically connected to the baseplate 112 or other element by conductive epoxy contacts 157.

FIG. 3D shows a damper 111 having been placed over the DSA region. Specifically, the damper 111 was placed to extend over the distal portion 152, the linkage portion 154, the motors 126, the tabs 128, and at least part of the proximal portion 150. As discussed previously, the viscoelastic material layer 160 can bond to the surfaces of these structures. The constraint layer 162 can be attached to the viscoelastic material layer 160 before the damper 111 is placed on the DSA suspension 110, or the constraint layer 162 can be attached to the viscoelastic material layer 160 after the viscoelastic material layer 160 has already been attached to the DSA suspension 110.

FIG. 3D shows that the damper 111 includes lobes 155. The lobes 155 in this embodiment are distal facing. The lobes 155 contour the damper 111 to allow access to the terminal on the face of the motor 126 to electrically connect to the motor 126 (e.g., for quality testing of finished or semi-finished DSA suspensions 110) while allowing at least part of the damper 111 to extend proximally of the motors 126 to attach to the proximal portion 150 of the baseplate 112. Cavities 131 can be formed within the damper 111 (e.g., through both of the constraint layer 162 and the viscoelastic material layer 160) to expose limited portions of the motor 126 and tabs 128. As shown in FIG. 3D, the cavities 131 can be between the lobes 155. However, in some other embodiments, the cavities 131 can be in the form of holes. The lobes allow greater damper coverage proximally (e.g., over the proximal portion 150) while leaving clearance around the grounding connection provided by the epoxy contacts 157.

Figure 4:
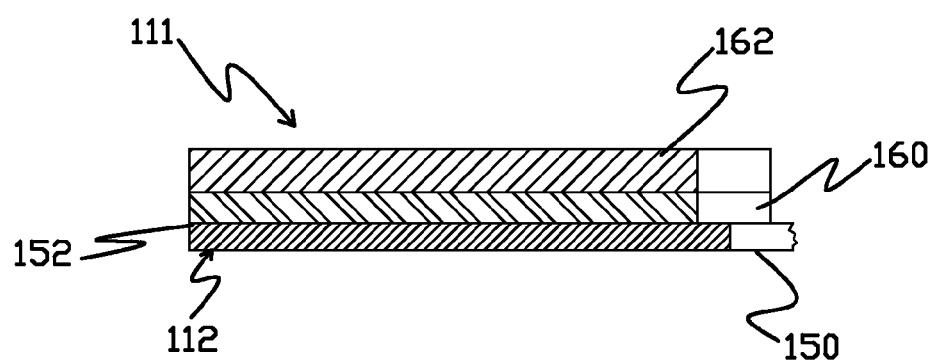
FIG. 4 is a cross sectional view of the DSA portion of the suspension shown in FIG. 3D, taken along line 4-4.

FIG. 4 is a cross sectional view of DSA region of the DSA suspension 110 along line 4-4 of FIG. 3D. As shown, the damper 111 is a multilayer structure. The damper 111 includes the viscoelastic material layer 160 disposed along the surfaces of the proximal portion 150, the linkage portion 154, and the distal portion 152. The constraint layer 162 extends along the viscoelastic material layer 160 opposite the baseplate 112. The top surface 161 of the damper 111 is not in connection or contact with other components of the disk drive. As shown, the constraint layer 162 is coextensive with the viscoelastic material layer 160 such that the two layers have identical coverage over the baseplate 112. Alternatively, the viscoelastic material layer 160 or the constraint layer 162 can extend beyond the other of the viscoelastic material layer 160 or the constraint layer 162.

Figure 5:
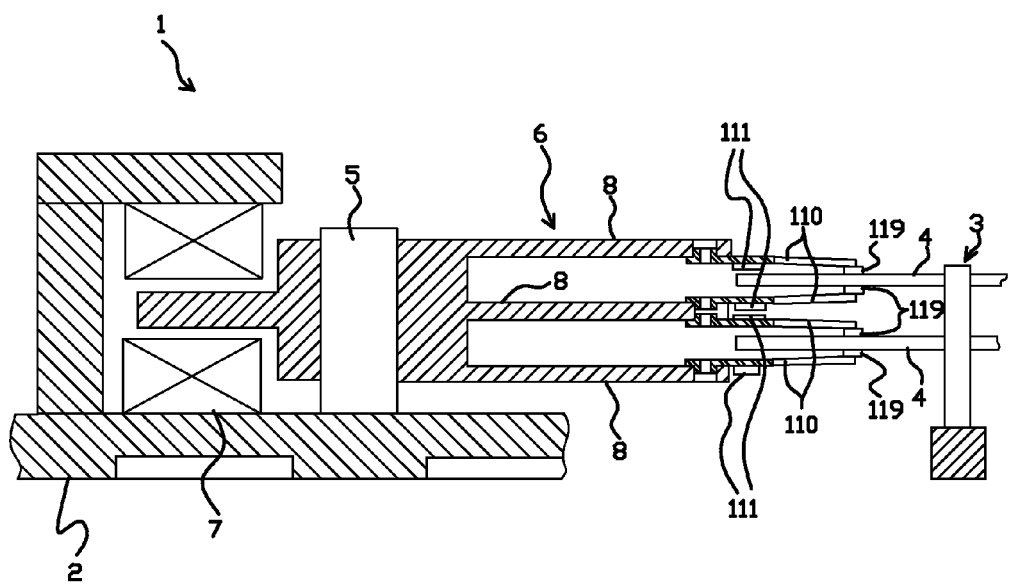
FIG. 5 is an illustration of a portion of a disk drive including a plurality of DSA suspensions in accordance with this disclosure.

FIG. 5 is an illustration of a hard disk drive (HDD) 1 having a plurality of damped DSA suspensions 110 in accordance with this disclosure. As shown in FIG. 5, disk drive 1 comprises a case 2, spindle 3, disks 4 rotatable about the spindle 3, carriage 6 turnable about a pivot 5, and a positioning motor (voice coil motor) 7 for actuating the carriage 6. The case 2 is covered by a lid (not shown). The carriage 6 comprises arms 8. Actuation of the carriage 6 moves the arms 8 to position the DSA suspensions 110 at select positions over the disks 4. The HDD 1 includes a plurality of DSA suspensions 110. A single DSA suspension 110 is mounted on the distal end of each arm 8. As discussed previously, a slider 119 is mounted on the distal end of each DSA suspension 110. Each slider 119 can include a magnetic head for reading and/or writing to one of the disks 4. When each disk 4 is rotated at high speed, an air bearing is formed between the disk 4 and the slider 119. As shown, the damper 111 on each respective DSA suspension 110 does not contact other portions of the disk drive 1 such as the arms 8 or other suspensions. For example, each damper 111 is only attached to a single DSA suspension 110, such that each damper 111 may only dampen the oscillations along the DSA region of the single DSA suspension 110 and outer sources of oscillations (e.g., from other DSA suspensions 110) are not directly routed to the particular damper 111.

Figure 6:
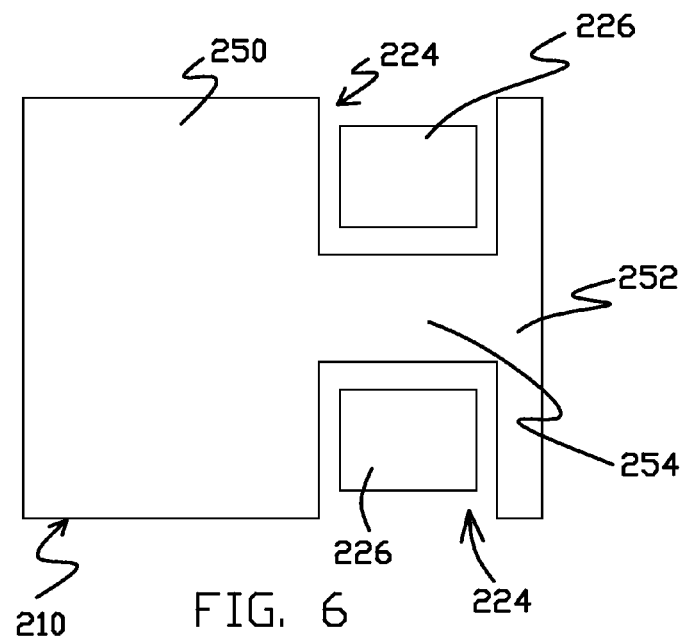
FIG. 6 is a top plan view diagrammatic illustration of a DSA portion of a suspension on which dampers in accordance with this disclosure can be mounted.

FIG. 6 is a top plan view diagrammatic illustration of a DSA region of a suspension 210 that can be used in connection with embodiments of this disclosure. The suspension 210 includes a proximal portion 250, a linkage portion 254, a distal portion 252, and two motors 226. The proximal portion 250, the linkage portion 254, and the distal portion 252 can be part of a support of the DSA suspension 210, such as a baseplate and/or a load beam. The motors 226 can be placed within the openings 224 between the distal end of the proximal portion 250 and the proximal end of the distal portion 252 along the linkage portion 254. The motors 226 can be attached to tabs (not shown) and/or to the proximal portion 250 and the distal portion 252. FIGS. 7-11 show different damper configurations for the DSA region of the suspension 210.

Figure 7:
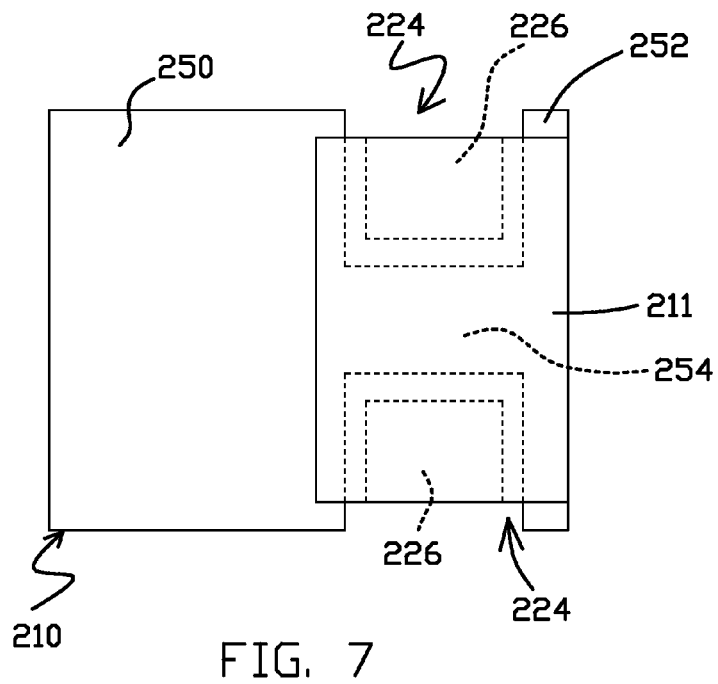
FIG. 7 is a top plan view diagrammatic illustration of the suspension shown in FIG. 6 including a damper in accordance with another embodiment of this disclosure.

In the embodiment of FIG. 7, the damper 211 extends to the distal end of the distal portion 252, covers an entire side of the linkage portion 254, and overlaps with part of the proximal portion 250. The damper 211 entirely overlaps one side (e.g., a major planar surface) of each of the motors 226. As further shown, the lateral edges of the damper 211 are aligned with the lateral edges of the motors 226. The profile of the damper 211 (e.g., the shape of the top surface) is a rectangle.

Figure 8:
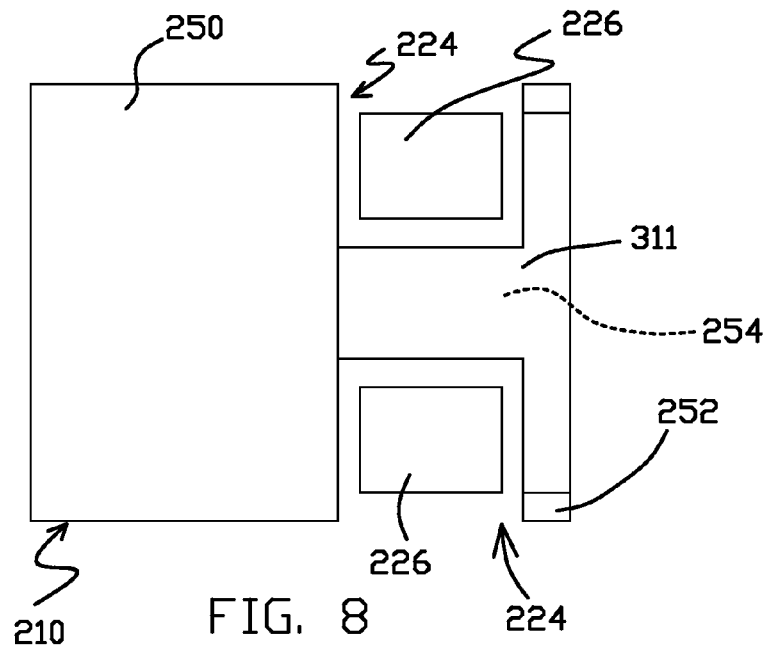
FIG. 8 is a top plan view diagrammatic illustration of the suspension shown in FIG. 6 including a damper in accordance with another embodiment of this disclosure.

In the embodiment of FIG. 8, the damper 311 extends to the distal end of the distal portion 252 and covers an entire side of the linkage portion 254. The damper 311 in this embodiment, however, does not overlap with the motors 226 or the proximal portion 250. As such, the damper 311 is not attached to the motors 226 or the proximal portion 250. The proximal edge of the damper 311 is aligned with the proximal edge of the linkage portion 254 (the distal edge of the proximal portion 250). Sections of the lateral edges of the damper 311 are aligned with the lateral edges of the proximal portion 250, however, the damper 311 includes two lateral branches that follow the distal portion 252 such that the damper 311 forms a "T" profile.

Figure 9:
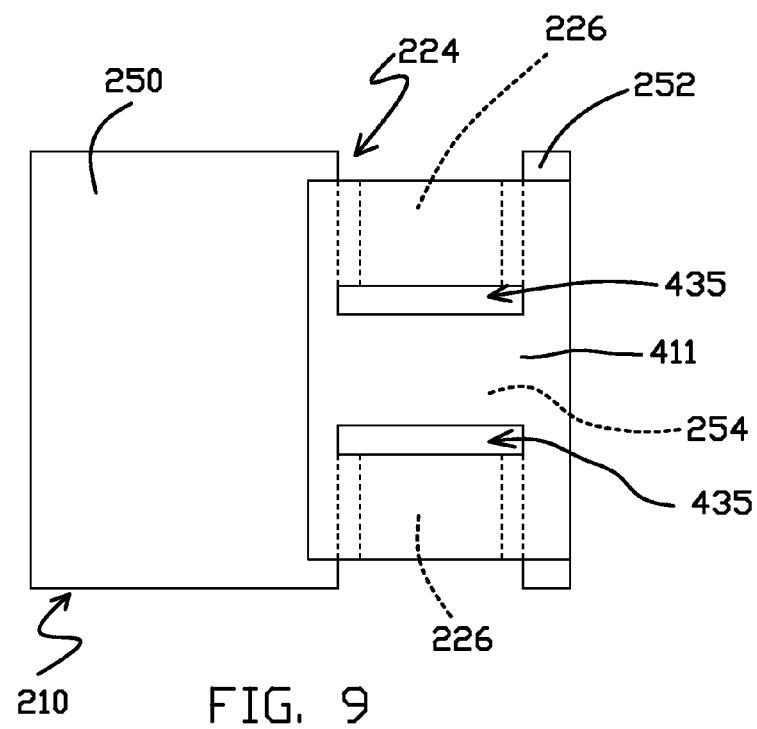
FIG. 9 is a top plan view diagrammatic illustration of the suspension shown in FIG. 6 including a damper in accordance with another embodiment of this disclosure.

In the embodiment of FIG. 9, the damper 411 extends to the distal end of the distal portion 252, covers an entire side of the linkage portion 254, and overlaps with part of the proximal portion 250. The damper 411 entirely overlaps one side (e.g., a major planar surface) of each of the motors 226. The lateral edges of the damper 411 are aligned with the lateral edges of the motors 226. The damper 411 includes holes 435. The holes 435 are in the shape of slots. The holes 435 are aligned with portions of the openings 224 between the lateral edges of the linkage portion 254 and the inner edges of the motors 226. As shown, the holes 435 can extend all the way though the damper 411 to span opposite sides (e.g., top and bottom) of the damper 411. The profile of the damper 411 forms an "8" shape.

Figure 10:
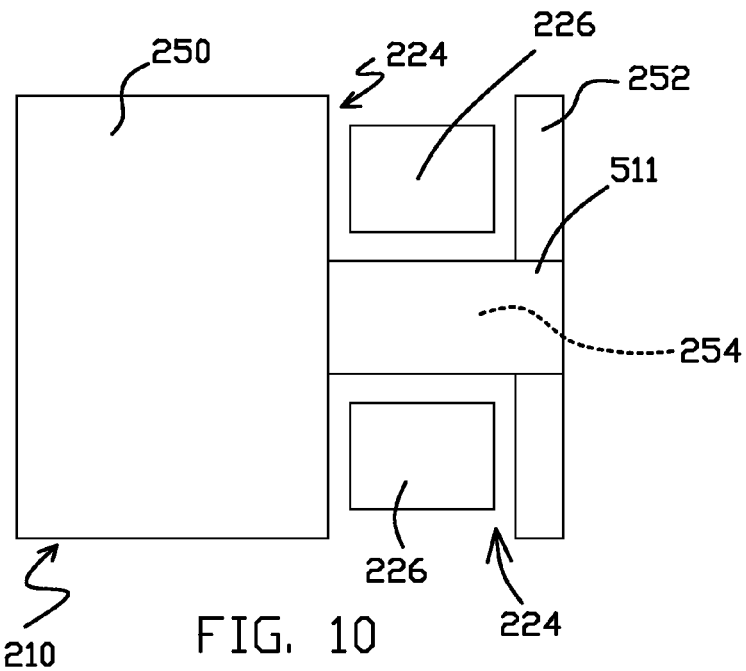
FIG. 10 is a top plan view diagrammatic illustration of the suspension shown in FIG. 6 including a damper in accordance with another embodiment of this disclosure.

In the embodiment of FIG. 10, the damper 511 extends to the distal end of the distal portion 252 and covers an entire side of the linkage portion 254. The damper 511 in this embodiment, however, does not overlap with the motors 226 nor with the proximal portion 250. As such, the damper 511 is not attached to the motors 226 nor the proximal portion 250. The proximal edge of the damper 511 is aligned with the proximal edge of the linkage portion 254 (the distal edge of the proximal portion 250). The lateral edges of the damper 511 are aligned with the lateral edges of the proximal portion 250 including along the distal portion 252. The profile of the damper 511 is a rectangular shape.

Figure 11:
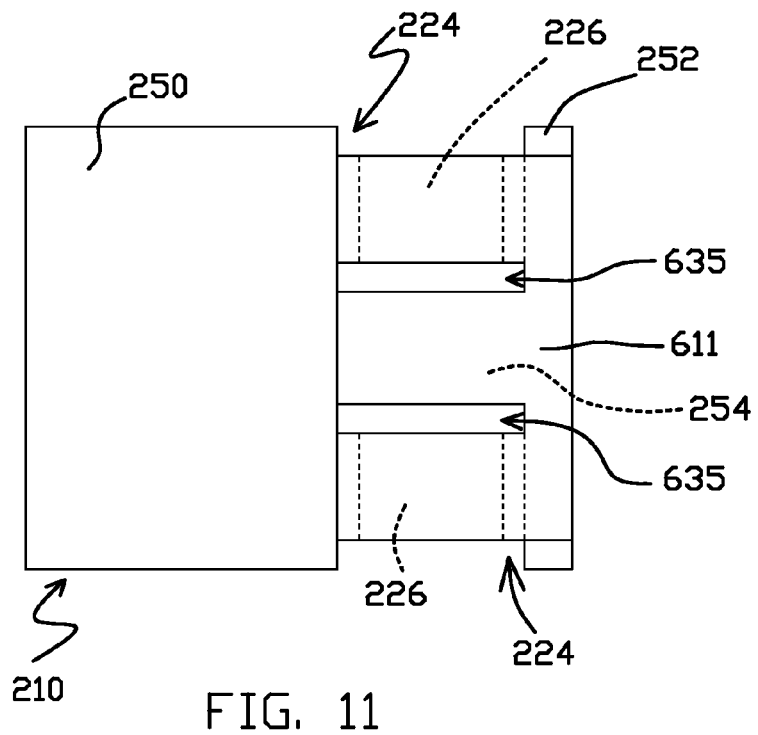
FIG. 11 is a top plan view diagrammatic illustration of the suspension shown in FIG. 6 including a damper in accordance with another embodiment of this disclosure.

In the embodiment of FIG. 11, the damper 611 extends to the distal end of the distal portion 252 and covers an entire side of the linkage portion 254 and the motors 226. The damper 611 in this embodiment, however, does not overlap with the proximal portion 250 and therefore is not attached to the proximal portion 250. The proximal edge of the damper 611 is aligned with the proximal edge of the linkage portion 254 (the distal edge of the proximal portion 250). The damper 611 entirely overlaps one side (e.g., a major planar surface) of each of the motors 226. The lateral edges of the damper 611 are aligned with the lateral edges of the motors 226. The damper 611 includes holes 635. The holes 635 are aligned with portions of the openings 224 between the lateral edges of the linkage portion 254 and the inner edges of the motors 226. As shown, the holes 635 can extend all the way though the damper 611 to span opposite sides of the damper 611. The profile of the damper 611 forms an "8" shape.

It is noted that while the linkage portion of the various embodiments (e.g., linkage portion 54, 154, 254) together with the distal portion (e.g., distal portion 52, 152, 252) have a "T" shape, other shapes are contemplated. These other shapes, for examples, can allow articulation along an elongated support of a suspension assembly. Accordingly, DSA dampening as described herein is not limited to the baseplate and/or load beam shapes and configurations presented herein. It is further noted that while DSA regions having two motors are discussed, dampening as described herein could be applied to any number of motors or configurations. For example, a damper can extend over a DSA region having only one motor in accordance with any of the other features or configurations referenced herein.

Figure 12:
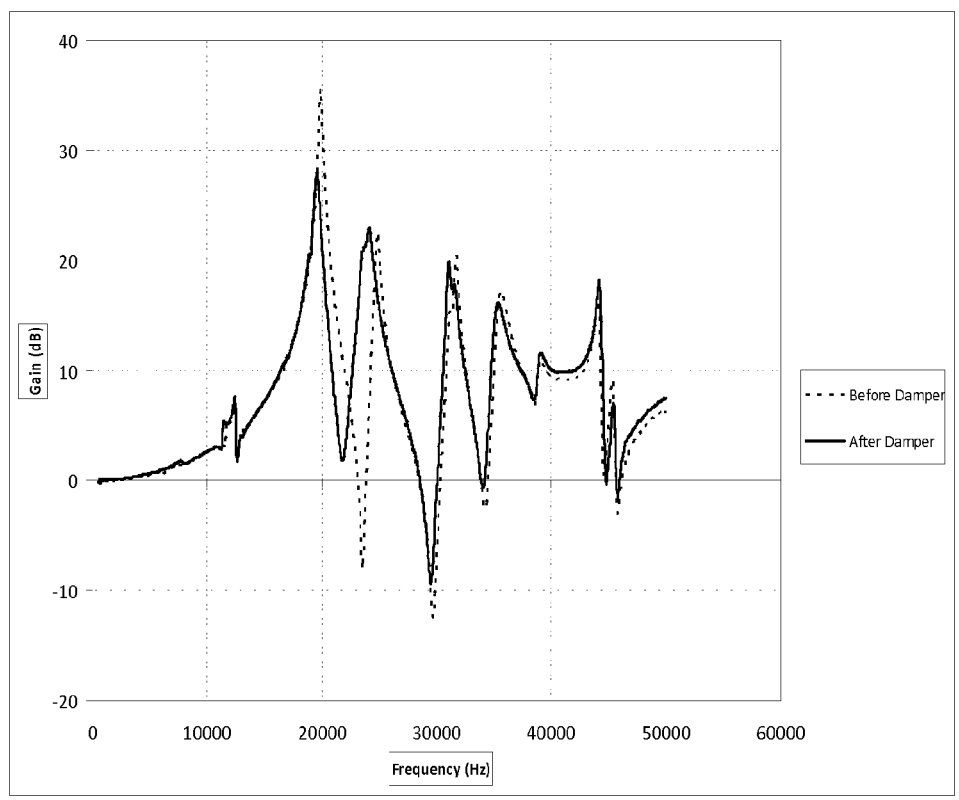
FIG. 12 is a bode plot showing increased performance of dampened DSA suspensions relative to undampened DSA suspensions.

Various benefits can be realized from dampening a DSA region of a suspension as presented herein. As shown in the test data of the bode plot of FIG. 12, sway gain was reduced for DSA suspensions that had dampened DSA regions as compared to similar DSA suspensions without such dampening. For example, a sway gain reduction of 8 decibels was achieved. Reductions in sway gain can result in an equivalent increase in frequency response of the DSA suspension. The 8 decibel reduction in sway gain can result in the equivalence of a frequency response increase of about 38%. As such, an increase the servo bandwidth can effectively be achieved by the DSA suspension dampening. These and other benefits can be realized by DSA region dampening.

Although the present disclosure has been described with reference to preferred embodiments, those skilled in the art will recognize that changes can be made in form and detail without departing from the spirit and scope of this disclosure. The damper can, for example, be located on the opposite side of the baseplate from that shown. The damper can also be incorporated into other DSA suspensions, including those with one or more than two motors.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

We claim:

1. A dual stage actuation (DSA) head suspension system of a disk drive, the DSA head suspension system comprising:
   a support configured to attach to the disk drive, the support comprising a proximal portion and a distal portion;
   a first motor mounted on the support, the first motor positioned between the proximal portion and the distal portion;
   a damper extending from the proximal portion to the distal portion and attached to both of the proximal portion and the distal portion, the damper extending over the first motor; and
   a flexure electrically connected to the first motor, wherein electrical activation of the first motor causes the first motor to move the distal portion relative to the proximal portion to actuate the distal portion laterally.

2. The system of claim 1, wherein the damper comprises a viscoelastic material layer.

3. The system of claim 2, wherein the visco elastic material layer is adhesive.

4. The system of claim 1, wherein the damper comprises a first layer and a second layer, the first layer formed from a different type of material than the second layer, the first layer attached to both of the proximal portion and the distal portion.

5. The system of claim 4, wherein the second layer comprises a constraint material and the first layer comprises a viscoelastic material layer.

6. The system of claim 1, further comprising a conductive contact extending between a terminal surface of the first motor and the proximal portion, the conductive contact electrically connecting the terminal surface to the proximal portion, wherein the damper comprises a pair of lobes and a cavity that exposes the conductive contact between the lobes.

7. The system of claim 1, wherein the damper comprises a top surface and a bottom surface opposite the top surface, the bottom surface facing the support and adhered to the support, the top surface facing away from the support and fully exposed.

8. The system of claim 1, wherein the damper is attached to the first motor.

9. The system of claim 1, wherein the first motor is attached to each of the proximal portion and the distal portion.

10. The system of claim 1, wherein the support further comprises a first opening, the first motor is positioned in the first opening, and the first opening is located between the proximal portion and the distal portion.

11. The system of claim 10, wherein the support further comprises a linkage portion connecting the proximal portion and the distal portion.

12. The system of claim 11, wherein the proximal portion is configured to attach to the disk drive and the linkage portion is configured to structurally support the distal portion while permitting the distal portion to be moved relative to the proximal portion by the first motor.

13. The system of claim 1, wherein the support comprises one or both of a baseplate and a load beam.

14. The system of claim 1, further comprising a head slider having circuitry configured to one or both of read and write data magnetically, the head slider mounted on the distal portion.

15. The system of claim 1, further comprising a second motor mounted on the support, the second motor extending between the proximal portion and the distal portion, wherein the flexure is electrically connected to the second motor such that electrical activation of the first motor and the second motor moves the distal portion relative to the proximal portion to actuate the distal portion laterally.

16. The system of claim 15, wherein the damper bridges between the first motor and the second motor.

17. The system of claim 1, wherein the damper is only attached to the support and one or more motors, the one or more motors including the first motor.

18. The system of claim 1, wherein the damper comprises a cavity that exposes a portion of the first motor.

19. A DSA head suspension system of a disk drive, the DSA head suspension system comprising:
   a support configured to attach to the disk drive, the support comprising a proximal portion, a distal portion, and a linkage portion bridging between the proximal portion and the distal portion;
   a first motor mounted on the support, the first motor extending along the linkage portion between the proximal portion and the distal portion;
   a second motor mounted on the support, the second motor extending along the linkage portion between the proximal portion and the distal portion;
   a damper extending between the first motor and the second motor, the damper attached to both of the first motor and the second motor, the damper extending over the linkage portion;
   and
   a flexure electrically connected to the first motor.

20. The system of claim 19, wherein the damper comprises a viscoelastic material layer.

21. The system of claim 20, wherein the damper further comprises a constraint layer extending over the viscoelastic material layer.

22. The system of claim 19, wherein the damper is attached to the linkage portion.

23. The system of claim 19, wherein the damper is only attached to the support and one or more motors, the one or more motors including the first motor and the second motor.

24. A head suspension system of a disk drive, the suspension system comprising:
   a support, the support formed from metal and comprising a proximal portion, a distal portion, a linkage portion bridging between the proximal portion and the distal portion, and an opening between the proximal portion and the distal portion along the linkage portion;
   a first motor positioned one or both of over and within the first opening;
   a damper disposed on one side of the support, the damper comprising a layer of material, the damper comprising a top surface and a bottom surface opposite the top surface, the bottom surface facing the support and attached to the distal portion, the linkage portion, and one or both of the proximal portion and the first motor, the top surface facing away from the support and fully exposed;
   and
   a flexure electrically connected to the first motor.

25. The system of claim 24, wherein the layer of material comprises a viscoelastic material layer.

26. The system of claim 25, wherein the damper further comprises a constraint layer extending over the viscoelastic material layer.

27. The system of claim 24, wherein the damper is only attached to the support and one or more motors, the one or more motors including the first motor.

28. A head suspension system of a disk drive, the suspension system comprising:

a support configured to attach to the disk drive, the support comprising a proximal portion, a distal portion, and a linkage portion bridging between the proximal portion and the distal portion;

a first motor mounted on the support, the first motor extending along the linkage portion between the proximal portion and the distal portion;

a second motor mounted on the support, the second motor extending along the linkage portion opposite the first motor, the second motor positioned between the proximal portion and the distal portion;

a damper attached to each of the proximal portion, the linkage portion, the distal portion, the first motor, and the second motor; and a flexure electrically connected to the first motor and the second motor, wherein electrical activation of one or both of the first motor and the second motor causes the distal portion to move relative to the proximal portion to actuate the distal portion laterally.

29. The system of claim 28, wherein the damper comprises a viscoelastic material layer.

30. The system of claim 29, wherein the damper further comprises a constraint layer extending over the viscoelastic material layer.

* * * * *

UNITED STATES PATENT AND TRADEMARK OFFICE
CERTIFICATE OF CORRECTION

| | |
|---|---|
| PATENT NO. | : 8,861,141 B2 |
| APPLICATION NO. | : 13/955204 |
| DATED | : October 14, 2014 |
| INVENTOR(S) | : Jacob D. Bjorstrom et al. |

It is certified that error appears in the above-identified patent and that said Letters Patent is hereby corrected as shown below:

In the Claims

Column 9, line 21 (claim 3), delete "visco elastic" and insert therefor --viscoelastic--.

Signed and Sealed this
Thirtieth Day of December, 2014

Michelle K. Lee
*Deputy Director of the United States Patent and Trademark Office*